United States Patent
Parsons

(12) 
(10) Patent No.: US 6,282,621 B1
(45) Date of Patent: *Aug. 28, 2001

(54) METHOD AND APPARATUS FOR RECLAIMING MEMORY

(75) Inventor: Jeffrey T. Parsons, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/096,116

(22) Filed: Jun. 11, 1998

Related U.S. Application Data

(63) Continuation of application No. 08/457,403, filed on May 31, 1995, now Pat. No. 6,141,722.

(51) Int. Cl.$^7$ .................................................. G06F 9/26
(52) U.S. Cl. .......................... 711/170; 711/171; 711/172; 711/173; 707/206
(58) Field of Search .......................... 707/206; 711/170, 711/171, 172, 173, 147, 148

(56) References Cited

U.S. PATENT DOCUMENTS

| | | | |
|---|---|---|---|
| 4,825,358 | * | 4/1989 | Letwin ..................................... 713/1 |
| 5,187,792 | * | 2/1993 | Dayan et al. ............................ 713/2 |
| 5,193,161 | * | 3/1993 | Bealkowski et al. ................. 711/206 |
| 5,491,808 | * | 2/1996 | Geist, Jr. ................................ 711/100 |

OTHER PUBLICATIONS

Bott, "Inside Windows 4.0," *PC/Computing*, Mar. 1994, pp. 124–139.

White, "'Out of Memory' Error? Don't Believe It," *PC/Computing*, Nov. 1993, pp. 194–196.

Knoblaugh, "Load Device Drivers from the DOS Prompt with DRVLOAD," *PC Magazine*, Nov. 9, 1993, p. 351.

Gralla, "Detective Software Gets to the Bottom of Your PC," *PC/Computing*, Jul. 1992, pp. 209–229.

Delfino, "Optimizing PC Performance in DOS 6.0," *Database*, Jun. 1994, pp. 98–100.

Holtzman, "Expanding the Limits," *Byte*, Mar. 1990, pp. 205–212.

Duncan, "Power Programming, Programming Considerations for MS–DOS 5.0, Part 1," *PC Magazine*, Oct. 29, 1991, pp. 407–411.

Duncan, "Power Programming, Programming Considerations for MS–DOS 5.0, Part 2," *PC Magazine*, Nov. 12, 1991, pp. 414–448.

* cited by examiner

*Primary Examiner*—Than Nguyen
(74) *Attorney, Agent, or Firm*—Klarquist Sparkman Campbell Leigh & Whinston, LLP

(57) ABSTRACT

A method and apparatus for automatically reclaiming and restoring memory occupied by redundant software components. In a computing environment which permits applications to run in the real-mode as well as the protected-mode, only one set of software components, either real-mode or protected-mode can be active at any one time. Protected-mode applications cooperate with a real-mode applications to remove and reclaim the memory occupied by redundant software components such as device drivers when the protected-mode applications boots. The real-mode software components are restored and replaced in memory when the protected-mode application quits. The memory reclaimed from redundant software components contributes to the maximum amount of memory available for use by both protected-mode applications, and real-mode applications.

27 Claims, 14 Drawing Sheets

PRIOR ART

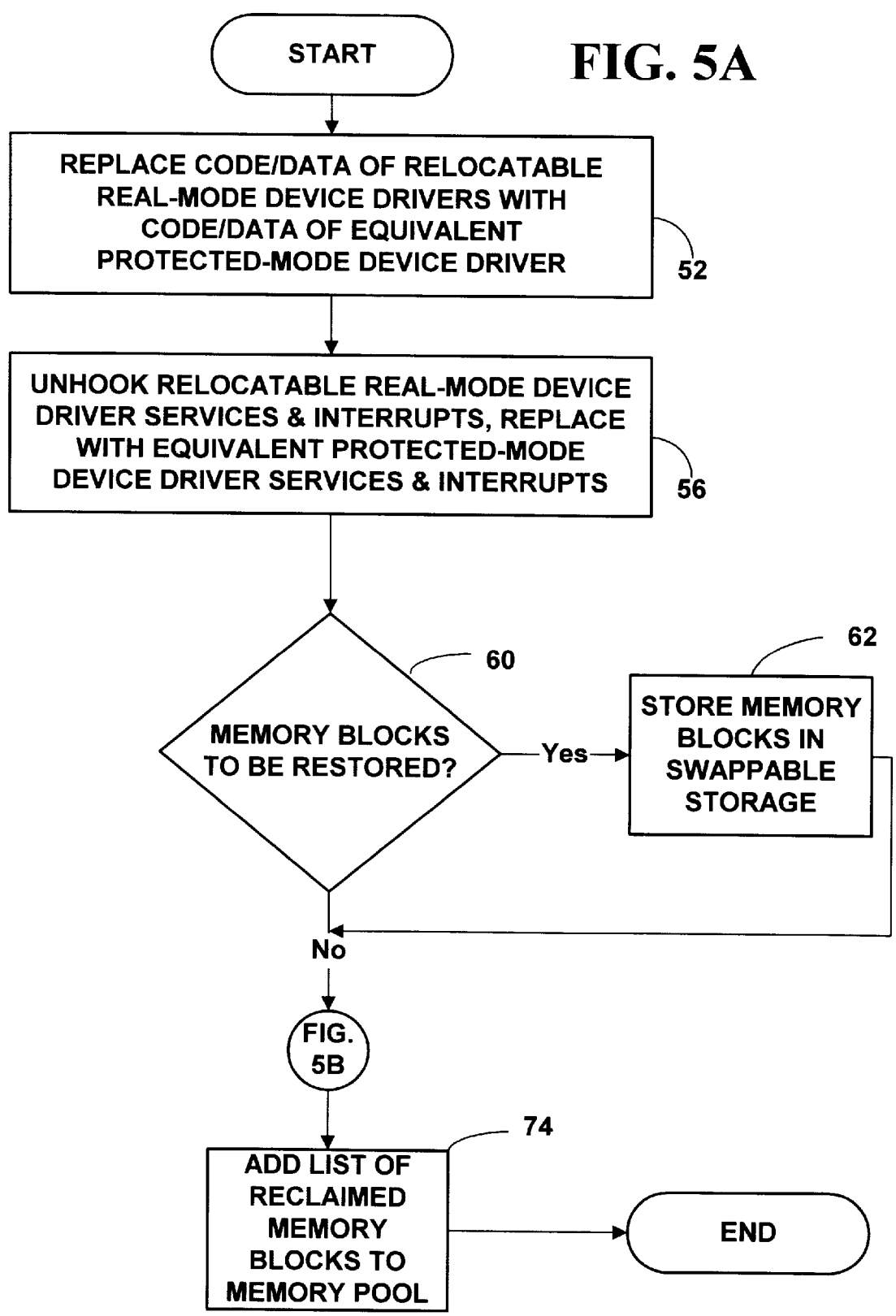

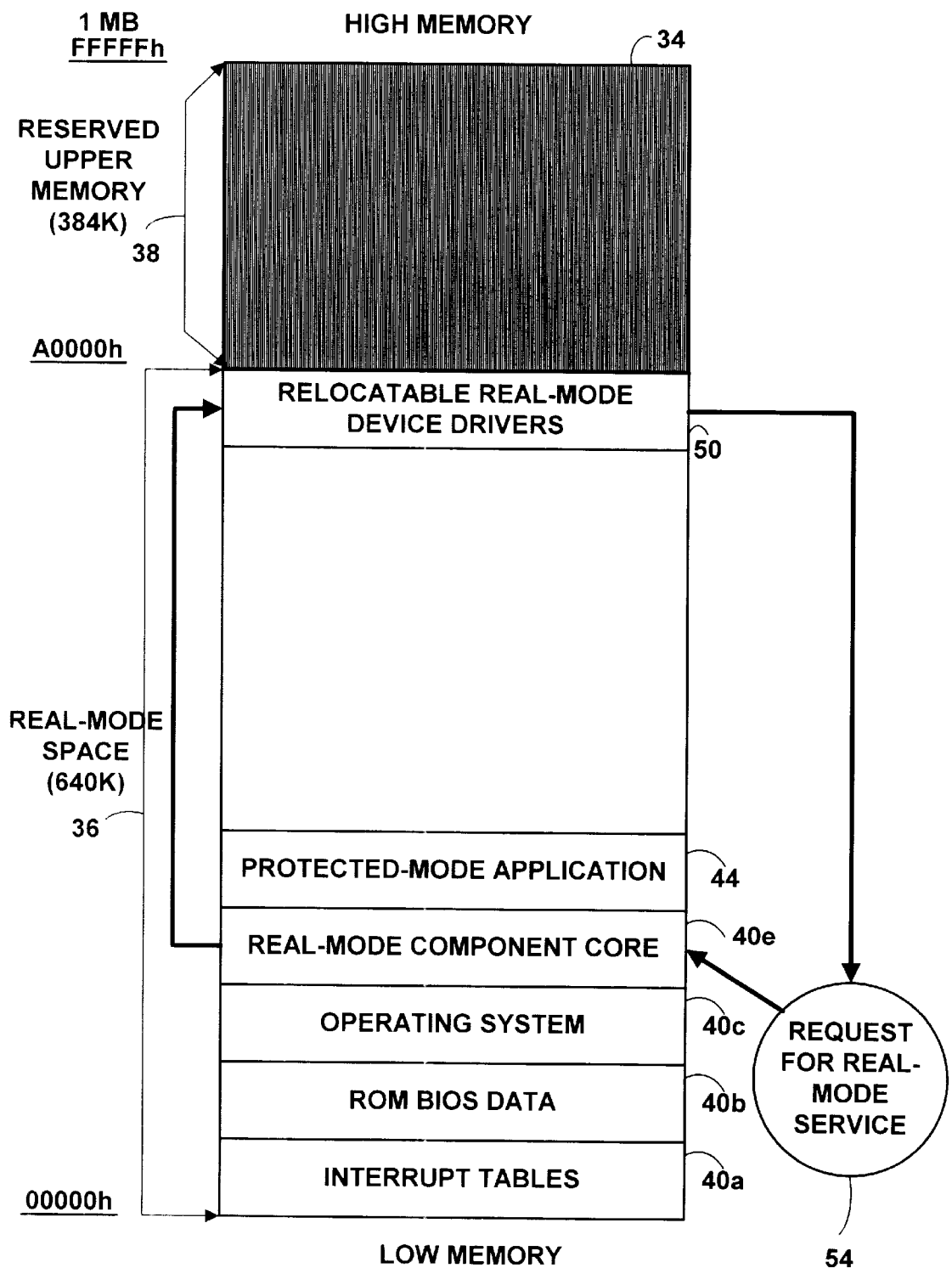

METHOD AND APPARATUS FOR RECLAIMING MEMORY

This application is a continuation of application Ser. No. 08/457,403, filed May 31, 1995 and now U.S. Pat. No. 6,141,272.

FIELD OF THE INVENTION

This invention relates generally to computer memory management techniques. More particularly, this invention relates to a method and apparatus for reclaiming main memory occupied by unneeded software components for use by application programs.

BACKGROUND OF THE INVENTION

Most computer memory systems are designed using a specific number of bits to address memory locations. For example, if 8 bits are used for addressing, then $2^8$ or 256, memory addresses are available. Increasing the number address of bits increases the number or addressable memory locations. Memory addressing schemes are typically linear or segmented. A linear addressing scheme uses a computer memory address register of a certain number of bits (e.g. 32 bits), to determine actual physical memory locations. When the memory address register is incremented, the next memory location is determined. A segmented memory address scheme uses a memory address register as well as segment registers to determine a memory location, and physical memory is often logically arranged and accessed by memory segments of a predetermined size. The segment registers are typically the same number of bits as the memory address register, (e.g. 16-bits). However, the segment registers are shifted (e.g. to the left) some number of bits (e.g. 4-bits) and then the values the segment registers contain are added to a memory address register to form a segmented memory address. In a segmented memory scheme, the contents of a segment register and a memory address register are added together to obtain a memory address location. Both contents are needed to form the complete address, unlike the flat or linear address scheme.

Many 16-data bit and 32-data bit computer systems used today were developed from earlier 8-data bit computer systems that incorporated the 8080 microprocessor manufactured by the Intel Corporation of Santa Clara, Calif. These early 8bit computer systems used a 16-bit register to address memory. A 16-bit address space allows $2^{16}$ or 65,536 total memory addresses, which is commonly called a 64K memory address space (since 1K is defined as $2^{10}$ or 1024 bytes). When the first 16-data bit computer systems were developed using the Intel 8086 microprocessor, the 16-bit memory address scheme was kept for backward compatibility with earlier hardware and software products, such as those that were developed around the Intel 8080.

To keep the 16-bit address scheme but allow for addressing a memory size larger than 64K, the Intel 8086 processor added four segment registers. The 8086 segment registers were 16 bits each. The 16 bits of a segment register are shifted to the left by 4 bits and combined with 16 bits of the address register to form a unique 20-bit address. A 20-bit address, $2^{20}$, gives 1,048,576 memory addresses or one megabyte of memory address space.

When the first personal computers (PCs) using the Intel 8086 were developed by IBM, it was decided to reserve 384K of the potential one megabyte memory address space for system hardware and software purposes. That left about 640K (1MB–384K) of memory address space free for use by the computer operating system and application programs. This 640K memory limit was built into the first disk operating system, called MS-DOS, designed and developed by Microsoft™, for Intel 8086-based computers. As a result, application programs running under MS-DOS programs can only use the 640K of available memory.

When Intel created the 80286 microprocessor, it was designed to operate in one of two distinct modes called the real-mode and the protected mode. First, it could run in a mode to be backward compatible with the 8086 which is called the real-mode. Second, it could run in advanced mode to take advantage of the new processor's advanced capabilities called protected-mode. Operating systems running on the 80286 were capable of switching the 80286 between real-mode and protected-mode (i.e. between the two distinct modes).

In real-mode, the processor uses the 8086 20-bit, one mega-byte memory address scheme. However, in protected-mode starting with the 80286, segments registers are no longer simply shifted left four bits and added to a given address as they are in real-mode (or the virtual-8086-mode introduced with the 80386 processor). Segment registers are indexes into a descriptor table and each entry in the descriptor table contains a 24-bit (or 32-bit in the case of 80386 and later processors) base address that is then added to a given memory address. In the 80286, the segment register selects a descriptor from the descriptor table yielding a 24-bit base address, to which a 16-bit memory address is added, yielding a final 24-bit memory address. A 24-bit memory address space allows $2^{24}$ memory addresses, or about 16.7 megabytes of memory.

Protected-mode offers several advantages over real-mode. These include a 24-bit memory address space, memory protection and the capability for the operating system to use any suitable area of physical memory as a segment. Thus, with the memory protection an operating system can set up an environment in which several programs run concurrently, each in its own protected memory area. And the memory segments of a program no longer needed to be contiguous and can vary in size. A program does not have to know where its memory segments are located in actual physical memory.

When the 80386 microprocessor was introduced by Intel, the notion of memory segments in real-mode was again kept for backwards compatibility. However, the 80386 also has 32-bit memory for addressing up to $2^{32}$ or 4 gigabytes of memory. In fact, a single segment can be up to 4 gigabytes in size, and a program can use the 80386 as though it had a linear address space.

Memory on the 80386 and later processors is divided up into 4 kilo-byte (4K) memory pages. Memory pages are the building blocks of every application that would be run using the 80386 or later processor. For example, the Windows™ operating system by Microsoft™ uses memory pages as the building blocks of every MS-DOS virtual machine that is created to run under Windows™. A MS-DOS virtual machine is a replication of a computer running MS-DOS in the real-mode even though it is executed in the virtual-8086-mode that is described below. Windows™ needs a minimum of 160 4 kilo-byte pages of physical memory to construct a 640K virtual machine (i.e. the 640K available memory area of the 1 MB address space described above).

A new operating mode called virtual-mode or "virtual-8086-mode" was also introduced with the 80386. Virtual-mode allows several concurrently running real-mode programs to share physical memory of the computer. The 80386 also provides protection of physical devices and unauthorized access to programs from other programs running concurrently in the system. The Intel 80486 microprocessor and the Pentium® microprocessor have further changed the processor hardware, but have preserved the 1MB (384K+ 640K) memory layout backward compatibility.

As a result of the changes in the Intel processor architecture and the need for backward compatibility, software programs designed to run under MS-DOS have to be compatible with the 8086 and the one megabyte memory layout as described above. With only 640K of memory generally available to run real-mode based applications, many software developers have devised ways to reclaim memory to use more than 640K. Many commercial products called DOS memory managers have been developed, such as QEMM, by Quarterdeck, Office Systems Inc. of Santa Monica, Calif. and 386Max by Qualitas of Bethesda, Md. These products try to increase the amount of memory available for existing MS-DOS-based applications by moving other software into expanded memory, extended memory, high memory, and other types of memory.

A DOS memory manager typically will increase the amount of memory available by switching the processor from the real-mode to the virtual-8086-mode, and use the processor's paging capability to map pages of extended memory (i.e. memory from outside the 1 MB range) into unused regions within the 1 MB range. For example, there are often unused areas in the 384K reserved portion in the 1 MB area that DOS memory managers can use a repositories for additional MS-DOS addressable memory.

Many operating systems such as Windows™ run in protected-mode, but still enable MS-DOS applications to run in virtual-8086-mode (the equivalent of real-mode). For example, Windows 3.x allows the use of many different kinds of real-mode applications programs, such as compilers, database programs, etc., as well as protected-mode programs and device drivers, all running simultaneously.

A disadvantage with respect to memory usages with applications that run in protected-mode is that they may include protected-mode device drivers that duplicate the functions of device drivers that run in real-mode. When the protected-mode application boots, essentially two copies of that device driver are loaded into memory, unnecessarily consuming this valuable resource. Another disadvantage is that the memory occupied by the real-mode drivers must be replicated in every MS-DOS virtual-machine spawned by a protected-mode application, which means every MS-DOS virtual-machine has less available memory than it might otherwise have.

Attempts have been made to solve the real-mode memory consumption problem. QuarterDeck Office Systems, Inc. has a feature in its QEMM product called "Stealth DoubleSpace," which swaps MS-DOS real-mode DoubleSpace driver in and out of memory as it is needed by a program running in the protected-mode. A disadvantage to this approach is that the DOS driver may have to be swapped many times, making use of the driver slower than normally would be expected. Another disadvantage to this approach is that applications may already have protected-mode device drivers that duplicate real-mode device drivers, making the swapping unnecessary.

An object of the present invention, therefore, is to temporarily or permanently remove real-mode based software components such as device drivers that are duplicated by protected-mode software components when an application that runs in the protected-mode boots. Removing real-mode components duplicated by the protected-mode reclaims substantial amounts of memory, thereby increasing the maximum available memory to be used for real-mode and other protected-mode applications. When the protected-mode application quits, the real-mode based software components are restored to their original state and location in memory so that the computer system can successfully return to the real-mode.

SUMMARY OF THE INVENTION

In accordance with the invention, a component that runs in a second mode such as a protected-mode removes first-mode-based software components such as real-mode-based components that are functionally equivalent to the second-mode software components. The first-mode components are designed to be split and located in memory in such a way as to allow memory reclamation. First-mode components that would normally occupy lower first-mode memory are split, and a portion of the first-mode component is re-located to the top of the first-mode memory, above the main block of free (unused) memory when the first-mode components are loaded. This memory, at the top of first-mode memory is then reclaimed, removing all interrupt hooks and services of the first-mode components. The reclaimed memory is then appended to the main free block, thereby maximizing the size of the largest first-mode application that can be created. The reclaimed memory is also usable by second-mode applications. The memory reclamation is completed in an intelligent way reclaiming as many large memory blocks, such as memory pages first, then reclaiming memory block fragments. When the second-mode application quits, the original contents of the first-mode components are restored, with original first-mode interrupt hooks and services replaced so the computer system can successfully return to first-mode, and use the first-mode components that had been removed and replace by the second-mode application.

In another embodiment of the invention, the memory reclaimed from real-mode components is not at the top of real-mode memory, (i.e. NOT above the main block of free memory), but is de-activated in lower memory. In this scenario, the freed memory is a memory "hole" and does not contribute to the maximum large block free memory available or provide additional contiguous memory for use by real-mode programs. However, the memory "hole" still provides a benefit to the operating system, because any whole pages in the "hole" can still be added to the operating system's memory page pool.

In yet another embodiment of the invention, the real-mode components are permanently removed from the top of real-mode memory as was described in the preferred embodiment, by certain applications, (e.g., by a network application running in protected-mode, that would never run in virtual-mode, never use the real-mode components or has no dependence on any real-mode component) thereby increasing maximum free available memory for both real-mode and protected-mode applications. The real-mode software components are never restored since they are never used again.

The foregoing and additional features and advantages of the present invention will be more readily apparent from the following detailed description thereof, which proceeds with reference to the accompanying drawings.

BRIEF DESCRIPTION OF THE DRAWINGS

FIGS. 5A–5B are flow charts showing the steps required to deactivate and reclaim memory occupied by a redundant real-mode software component.

FIG. 6A is a block diagram showing the process flow for a service request to a redundant real-mode software component that has not yet been deactivated.

DETAILED DESCRIPTION OF PREFERRED EMBODIMENTS

Figure 1:
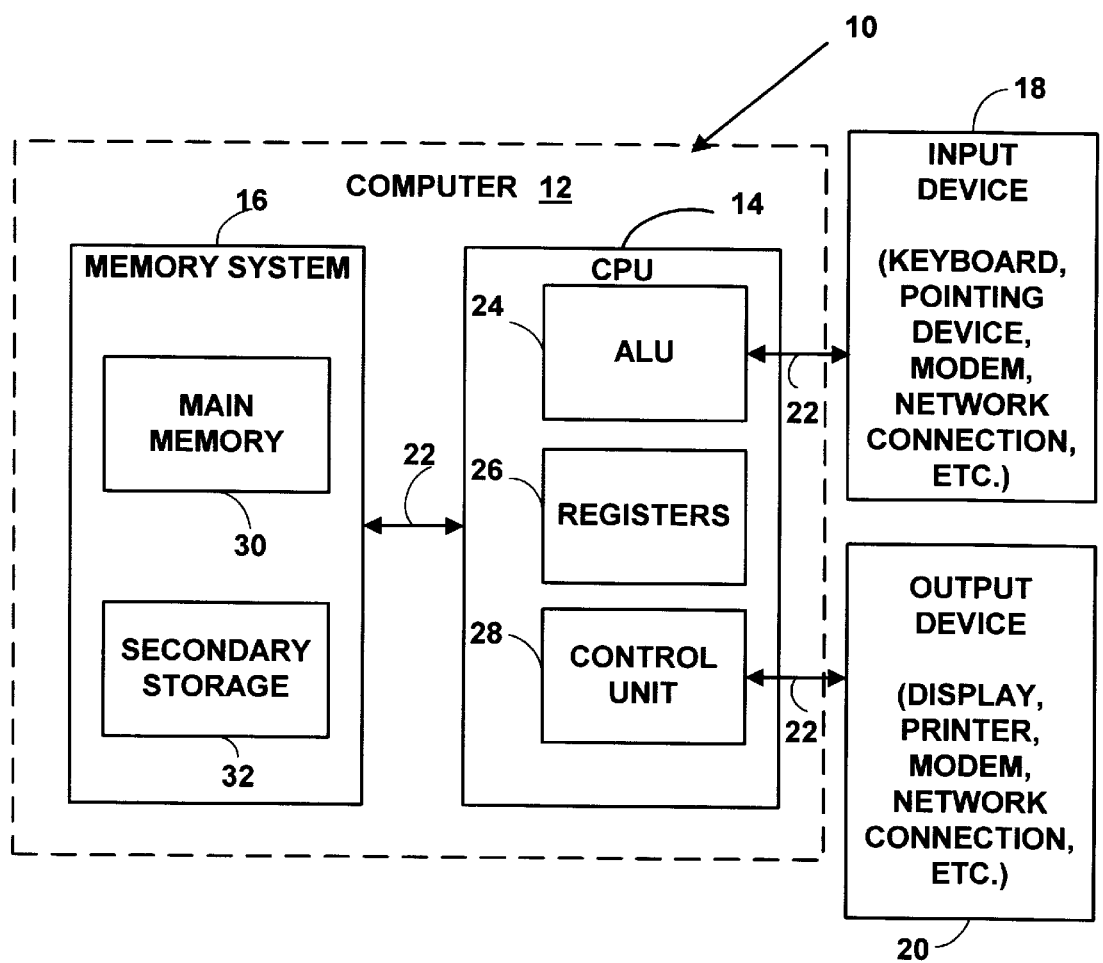
FIG. 1 is a block diagram of a computer system which can be used to implement a method and apparatus embodying the invention.

Referring to FIG. 1, an operating environment for the preferred embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment, Sun, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry (e.g. a processor-in-memory (PIM) chip which contains standard M-bit memory augmented with a N-bit CPU controlling each column of memory). Secondary storage 32 takes the form of a long term storage device, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, sound device (e.g. a microphone, etc.), or any other device providing input to the computer system 10. The output device 20 can comprise a display, a printer, a sound device (e.g. a speaker, etc.), or other device providing output to the computer system 10. The input/output devices 18, 20 can also include network connections, modems, or other devices used for communications with other computer systems or devices.

As is familiar to those skilled in the art, the computer system 10 further includes an operating system and at least one application program. The operating system is the set of software which controls the computer system's operation and the allocation of resources. The application program is the set of software that performs a task desired by the user, making use of computer resources made available through the operating system. Both are resident in the illustrated memory system 16.

In accordance with the practices of persons skilled in the art of computer programming, the present invention is described below with reference to symbolic representations of operations that are performed by computer system 10 executing a computer program that includes coded instructions, unless indicated otherwise. Such operations are sometimes referred to as being computer-executed. It will be appreciated that the operations which are symbolically represented include the manipulation by CPU 14 of electrical signals representing data bits and the maintenance of data bits at memory locations in memory system 16, as well as other processing of signals, in response to program instructions. The memory locations where data bits are maintained are physical locations that have particular electrical, magnetic, optical, or organic properties corresponding to the data bits.

The invention is further described with reference to a computer system whose CPU has a first mode of operation, such as the real mode or virtual8086-mode of Intel microprocessors, and a second mode, such as the protected-mode of these microprocessors. However, it should be understood that this description is only for the purpose of illustration and not for the purpose of limitation. The invention is not limited to use with Intel microprocessors or with these Intel modes of operation. It can be used with any computer system having equivalent modes of operation.

THE 640K MEMORY BARRIER FOR REAL-MODE PROGRAMS

Figure 2:
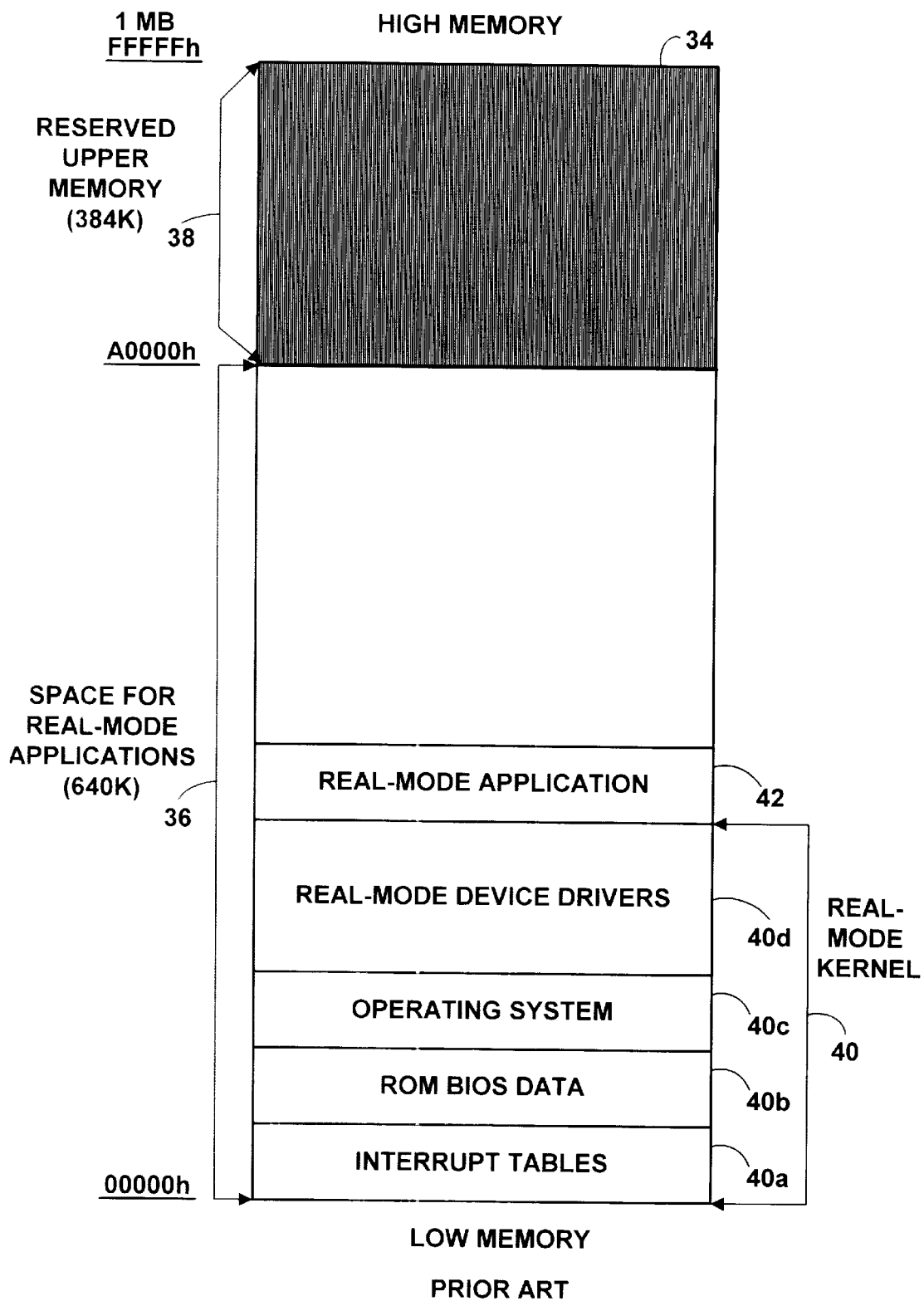
FIG. 2 is a block diagram of a one megabyte backward compatible real-mode memory layout.

FIG. 2 shows how real-mode memory with a backward compatible one megabyte (MB) limit for a memory system 16 of the computer 12 shown in FIG. 1 is laid out. The real-mode memory layout is limited to one MB of memory to comply with backward compatibility standards used in earlier 20-bit segmented memory layout schemes. Only one megabyte of memory is available to real-mode programs since they use a 20-bit segmenting addressing scheme. The one MB of memory 34 includes a 640K segment 36, and a 384K segment 38. A portion of the 640K segment typically contains a real-mode kernel 40 comprised of things required for real-mode operations such as interrupt tables 40a, Read- Only Memory (ROM) Basic Input Output System (BIOS) data 40b, operating system components 40c, and real-mode device drivers 40d. The area above real-mode kernel 40 is free memory 36 that is available for use by real-mode operating system and application programs. The 384K segment 38 is typically reserved for hardware devices and ROM chips that are used within the computer 12 (FIG. 1).

A real-mode application 42 is typically loaded above the real-time kernel 40 into free memory 36. The presence of an application 42 decreases the amount of free memory 36 (640K space) available to run the application as well as other real-mode applications that may be stored in free memory 36. For this reason, many real-mode applications include protected-mode memory managers to reclaim as much memory in the 640K area as possible for running the applications.

Figure 3:
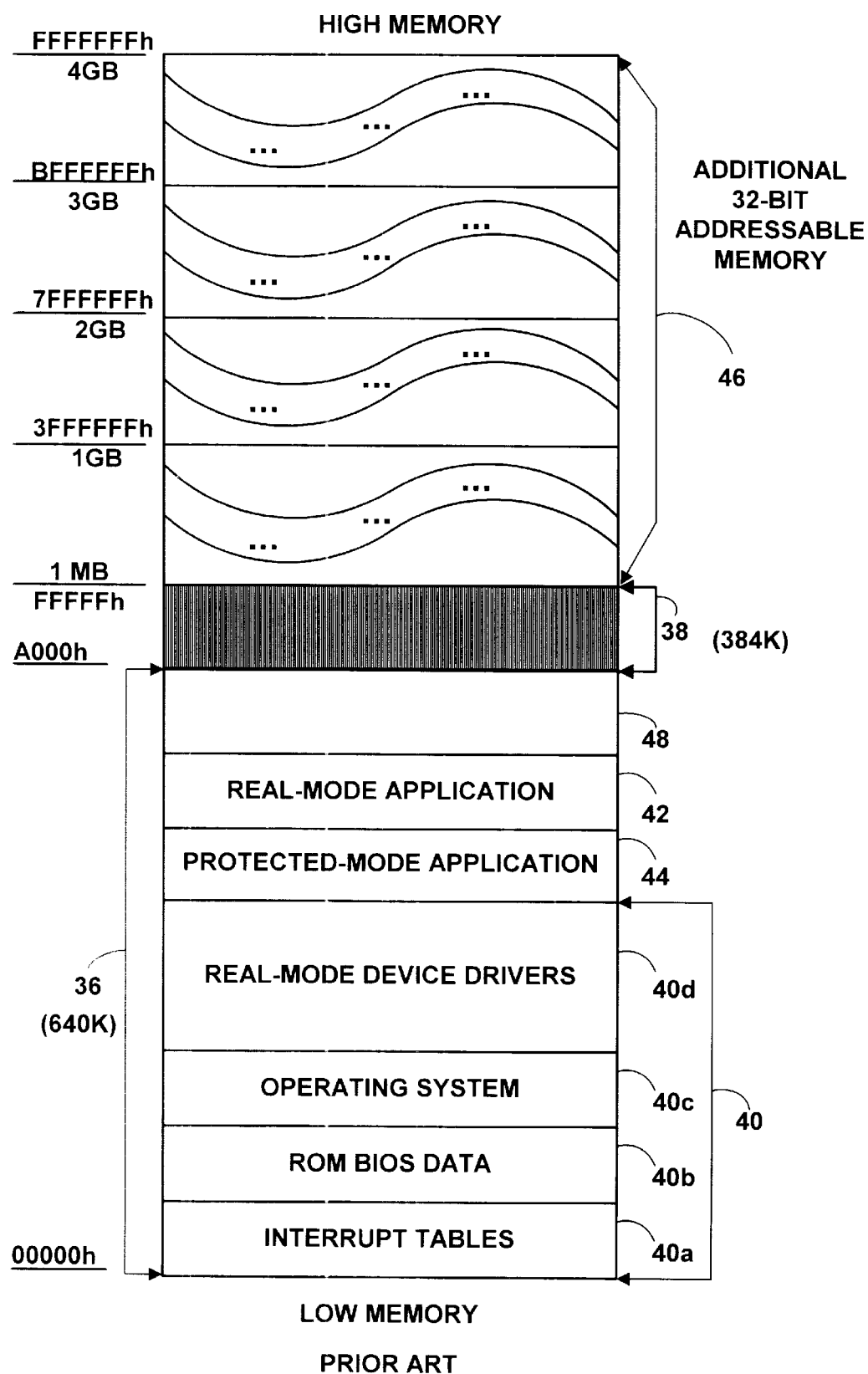
FIG. 3 is a block diagram of a four gigabyte protected-mode memory layout.

Referring to FIG. 3, a protected-mode application 44 is also typically loaded at least partially into free memory 36. This further decreases the amount of free real-mode memory available. However, protected-mode programs use a different addressing scheme and are not limited by the 640K and one MB barriers. For example using a 32-bit addressing scheme would allow memory addressing up to 4 gigabytes ($2^{32}$). This additional 32-bit addressable memory 46 is shown in FIG. 3. Therefore, using memory within the 1 MB free memory area 36 (640K block) of real-mode memory layout is usually not detrimental to a program running in the protected-mode, unless the computer system it is being run upon is memory constrained.

However, problems typically arise when a protected-mode application 44 spawns a real-mode 42 application that is constrained to run in the free high memory area 36. In this case, the protected-mode and real-mode programs in the free memory area 36 leave only a small amount of memory 48 for use by other real-mode applications. In addition, many protected-mode applications have device drivers that have functionality equivalent to real-mode device drivers in memory. Since only one of the two device drivers can be used at any one time, some of this memory is wasted.

Memory Reclamation

Figure 4:
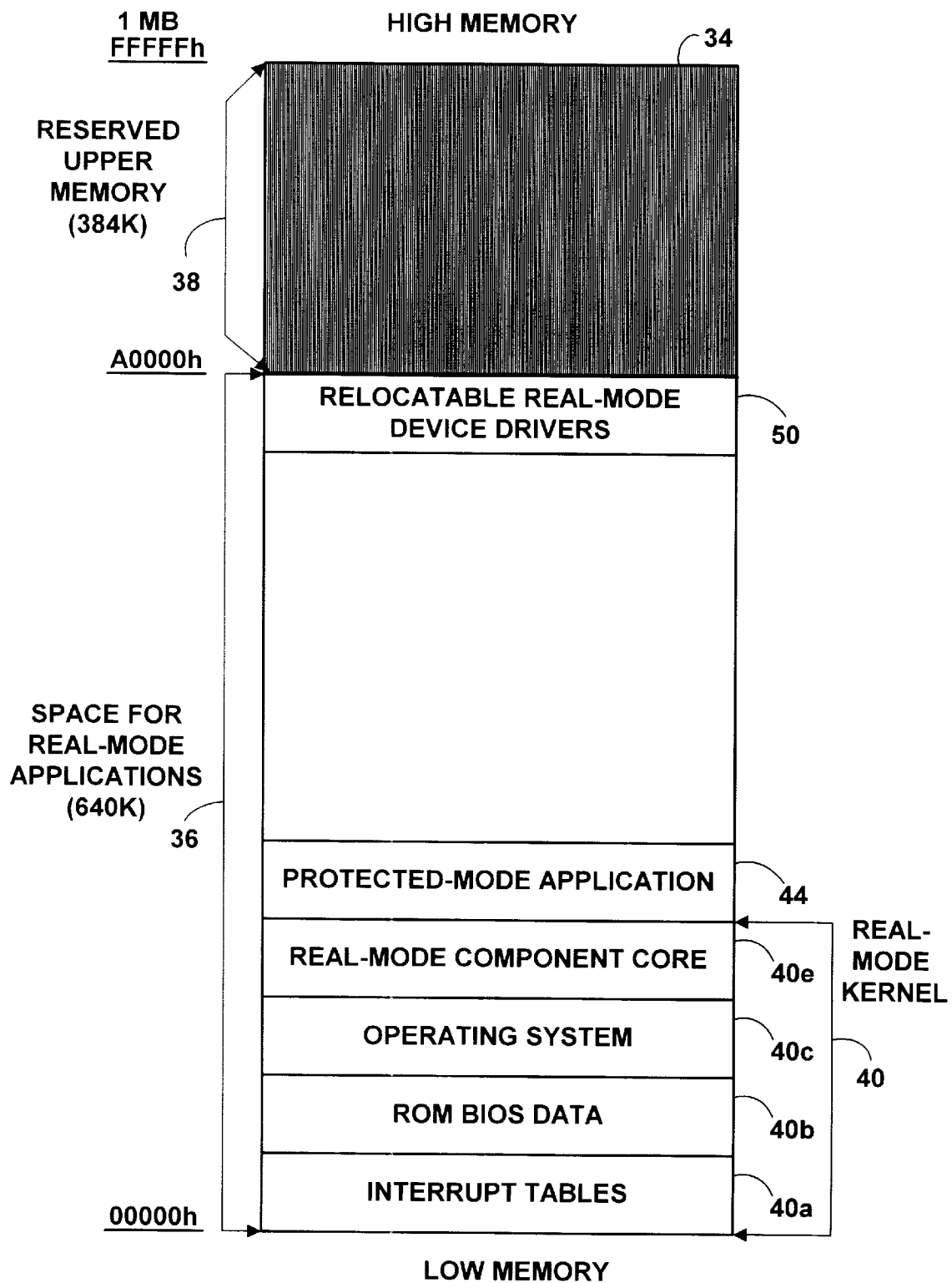
FIG. 4 is a block diagram showing the memory layout for a redundant real-mode software component such as a device driver that has been split and reallocated within the one megabyte backward compatible real-mode memory layout.

In the preferred embodiment of the invention, the real-mode components cooperate with protected-mode components to reclaim memory occupied by duplicated device drivers within the free memory area 36 of the one MB memory layout 34. A set of real-mode device drivers that are available for reclamation (i.e. typically duplicated in protected-mode applications) are split and relocated within high free memory 36 as the real-mode kernel 40 is loaded into low free memory 36. As is shown in FIG. 4, when a real-mode device driver is split, a relocatable portion 50 is moved to high memory within the free memory space 36, and a small real-mode component core 40e remains in low memory.

During the splitting and relocating process, memory blocks occupied by the relocatable real-mode device drivers 50 are marked as reusable (i.e. reclaimable). A memory block is an area of memory defined by the operating system to be a specific size (e.g. 1024 bytes or 1K). A declaration that a relocatable real-mode device driver 50 memory block is reusable involves specifying the following information for each relocated memory block: (1) address of the block; (2) size of the block; (3) addresses of services or interrupt handlers associated with the block, if any; and (4) any special characteristics of the block. The special characteristics of a memory block include whether the block is currently reclaimable, whether the block must be restored prior to shutdown of the protected-mode program, and whether the block is currently part of the operating system memory area 40c.

Referring again to FIG. 4, when a protected-mode application 44 boots, it examines the marked memory blocks occupied by replaceable real-mode device drivers 50 that have been split and relocated to the top of free memory 36 (i.e. in the 640K section) to determine which real-mode device drivers may be duplicated (which may be none, one, or more than one) in the protected-mode program 44. As FIG. 4 shows, a component core 40e of each real-mode device driver that was relocated is left in low memory within the real-mode kernel 40. Real-mode component core 40e provides hooks and execution paths for applications that may still call the original real-mode device driver which has been relocated to high memory. Following this check, the protected-mode application 44 begins reclaiming memory occupied by any relocatable real-mode device drivers 50 that are duplicated in the protected-mode application.

Figure 5B:
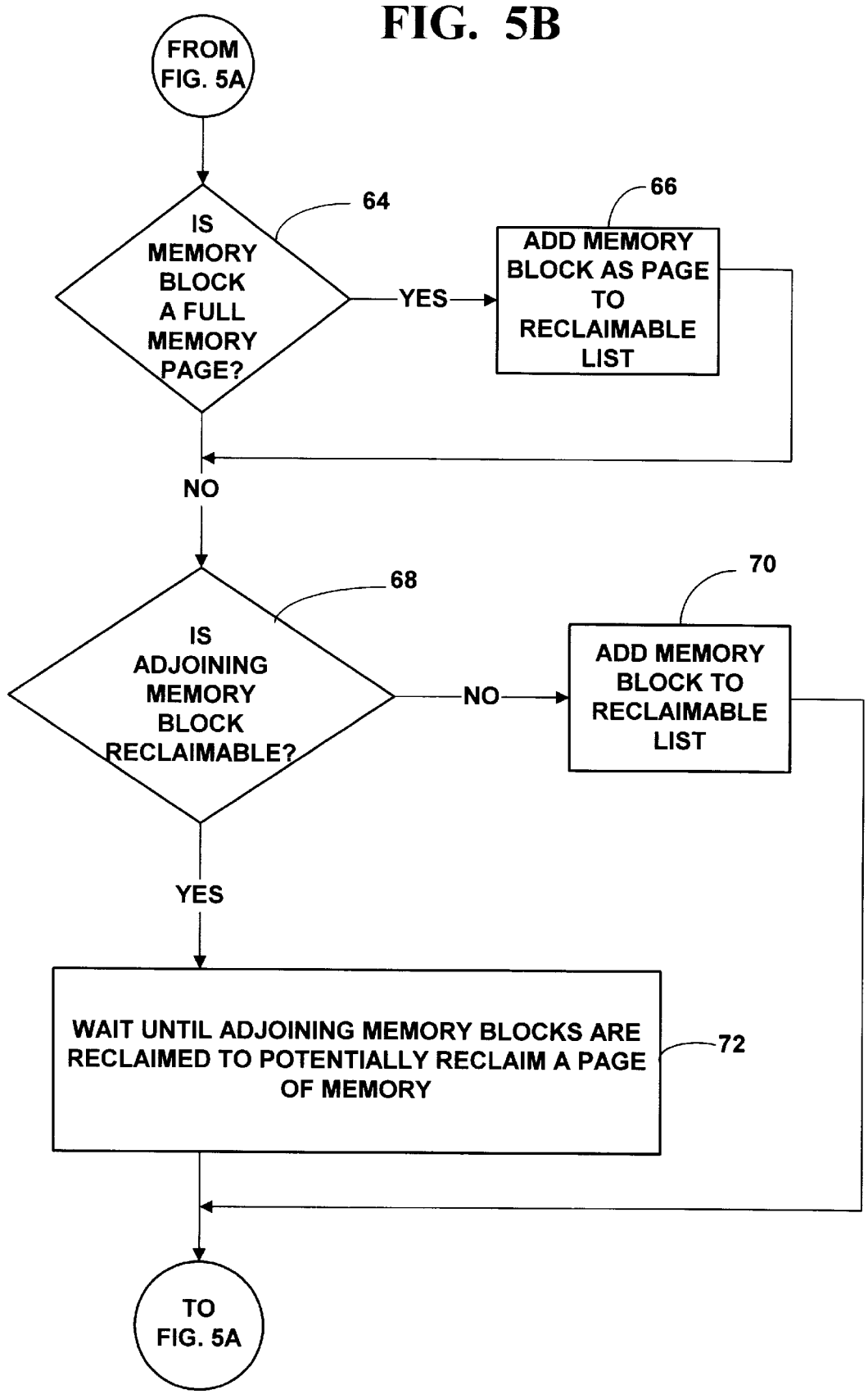

The relocatable real-mode device drivers 50 that duplicate protected-mode functionality are deactivated and the memory they occupy in the 640K area 36 is re-claimed for use by other applications (i.e. use by both real-mode and protected-mode applications). FIGS. 5A–B are flow charts of the required steps to deactivate and reclaim the memory occupied by relocatable real-mode device drivers.

Figure 6B:
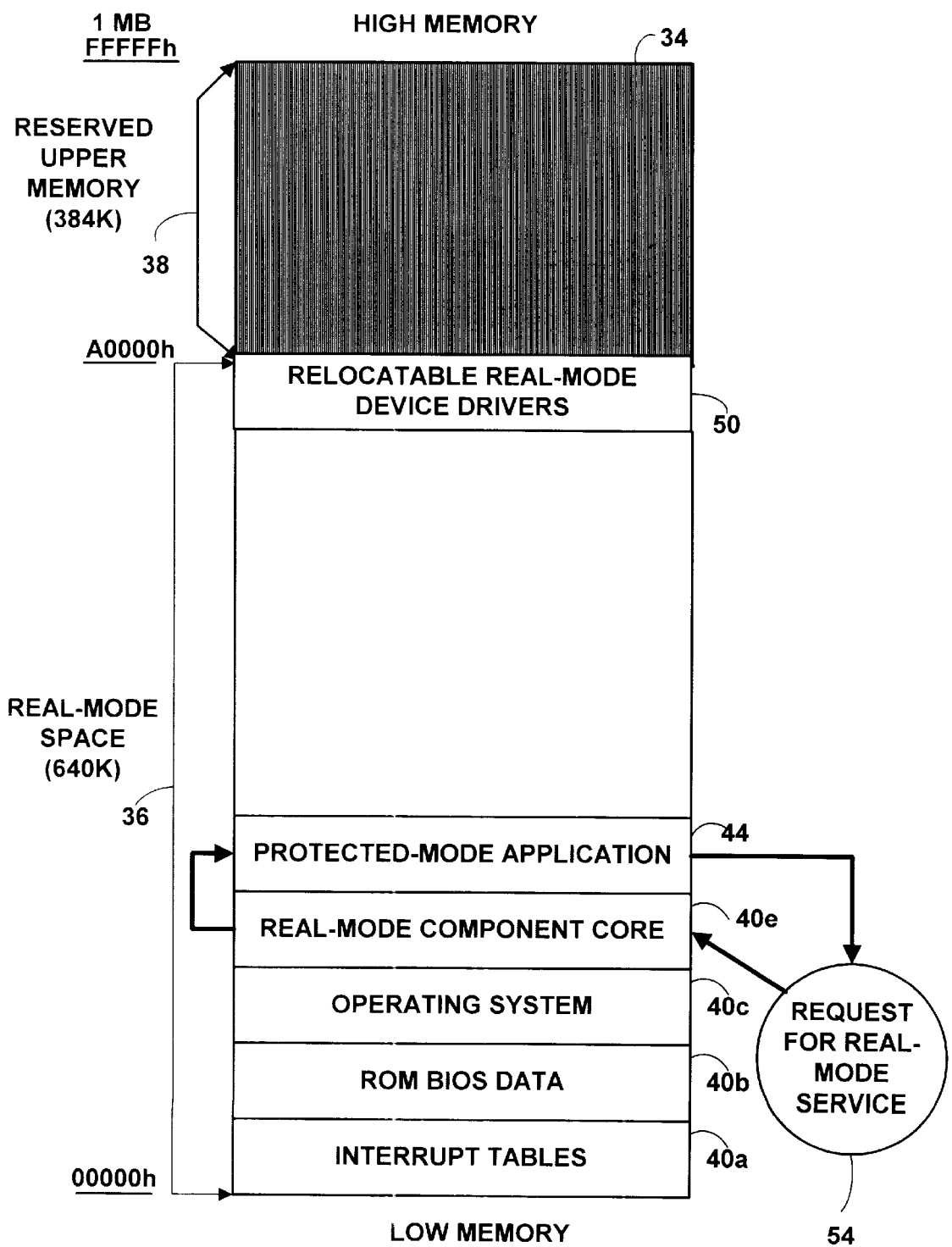
FIG. 6B is a block diagram showing the process flow for a service request to a redundant real-mode software component that has been deactivated.

Referring to FIG. 5A, the first step (52) in the deactivation replaces all external services or data provided by the real-mode driver by equivalent code in the protected-mode driver. This replacement will allow the relocatable real-mode device drivers 50 (FIG. 4) to be removed from memory. Normally, when real-mode services are requested, the real-mode device drivers 40d (FIG. 2) would make a call to routines providing real-mode functionality directly within the real-mode device drivers 40d (FIG. 2) located in low real-mode memory. Since the routines to provide this functionality in the real-mode device drivers 40e (FIG. 6A) have been relocated 50 to high memory within free memory 36, this is where the function calls for a request for a real-mode service 54 would be executed as shown in FIG. 6A. However, the same functionality contained in the relocatable real-mode device driver 50 is provided by using equivalent code in a protected-mode device driver within the protected mode application 44. The real-mode component core 40e is then modified to make calls to the corresponding protected-mode device driver located in the protected-mode application 44. When real-mode services 54 are requested, protected-mode routines will provide the services, as illustrated in FIG. 6B.

Figure 7A:
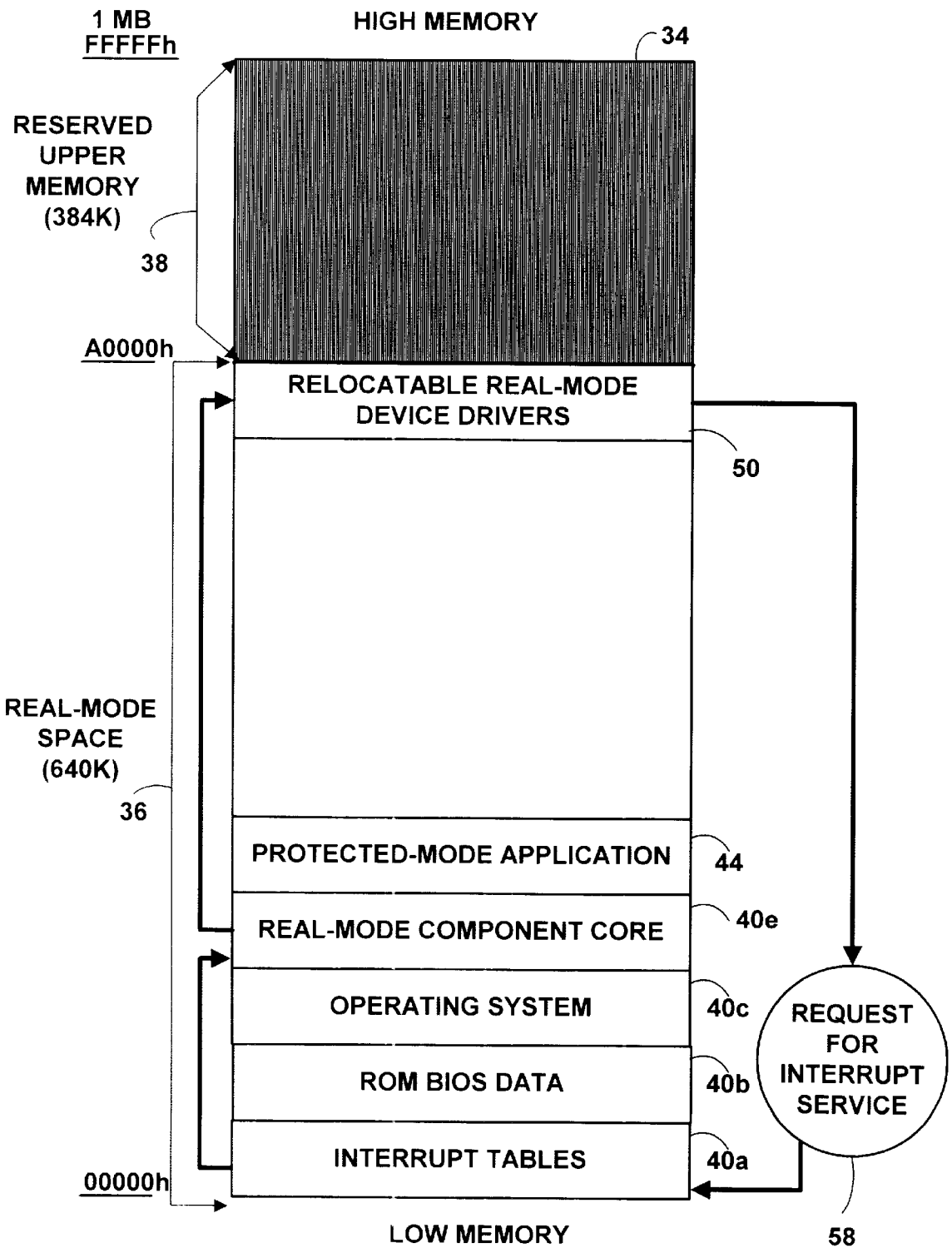
FIG. 7A is a block diagram showing the execution path for an interrupt service request to a redundant real-mode software component that has not yet been deactivated.
Figure 7B:
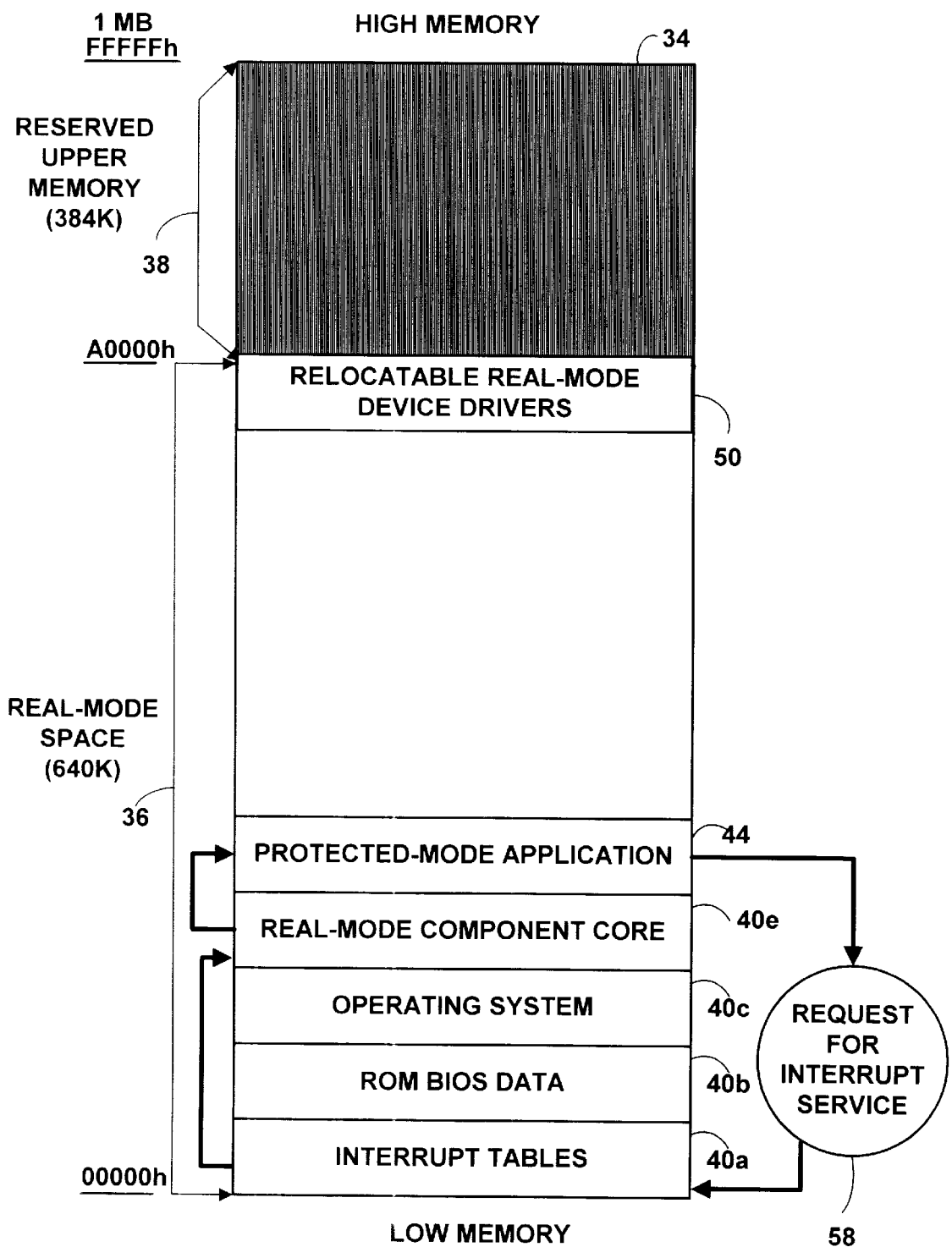
FIG. 7B is a block diagram showing the execution path for an interrupt service request to a redundant real-mode software component that has been deactivated.

A second deactivation step (56) unhooks previous interrupt handlers, etc. contained in the code of the relocatable real-mode device drivers 50. For this step, unhooking is the process of diverting any execution path through the real-mode memory blocks to be reclaimed 50 to alternate paths in the protected-mode application. In the first deactivation step 52, real-mode device driver code/data was replaced by equivalent protected-mode device driver code/data to handle request for real-mode services. In step (56), the relocatable device driver real-mode code/data is unhooked from all the possible execution paths (such as interrupts, etc.) by modifying the real-mode component core 40e. Thus no unpredictable gaps are left in the execution paths when the real-mode memory block is reclaimed. FIGS. 7A and 7B illustrate the effect of this step. FIG. 7A shows what occurs if an interrupt service request 58 contains a jump from an interrupt vector to a routine in the real-mode device driver that has been relocated 50 to high memory. The real-mode core component core 40e accepts the interrupt service request and calls a routine in the relocatable real-mode device driver 50 that has been relocated. FIG. 7B shows what occurs as a result of the unhooking. The real-mode interrupt service routine in the real-mode component core 40e is modified to call an equivalent interrupt service routine in the protected-mode application 44. Thus the interrupt service execution path is unhooked from the relocatable real-mode device drivers 50.

Returning to FIG. 5A, the next step (60) reclaims the memory block or blocks of memory 36. If the memory blocks occupied by the relocatable real-mode device drivers are to be restored (60) when the protected-mode program quits, then the contents of the real-mode memory blocks (including both the relocated and core portions of the real-mode device driver) are saved in swappable storage (62), such as a hard disk.

The reclaimed blocks of memory are merged with neighboring blocks if possible. As is shown in FIG. 5B, if the memory block is a full memory page (64), then the memory block is added to the memory pool as a memory page (66). The memory pool is a group of free memory blocks typically managed by a memory manager. A memory page typically is defined to occupy a certain size of memory (e.g. 4K). If the reclaimed blocks of memory do not amount to a page of memory, then the adjoining memory blocks are checked (68). If memory blocks reclaimed from one real-mode device driver are located in an area adjoining memory that will not be reclaimed from another real-mode device driver, the memory blocks are added to a memory block list and returned later to the memory pool (70) if a full memory page can't be created. A memory block list contains blocks of memory which are less than a memory page in size. Whether adjoining blocks can be reclaimed is determined by looking at the characteristics of the memory block described above as the real-mode device driver was split and relocated. Looking at adjoining blocks allows for the potential of reclaiming a whole page of memory when the memory for the next real-mode device driver is reclaimed, thereby adding a larger chunk of usable memory to the maximum available memory block. On the other hand, if the adjoining memory blocks can be reclaimed, the memory blocks currently being reclaimed are collected into as large a memory block as possible that will be used during a later reclamation (72) when the adjoining blocks are reclaimed. Then the process proceeds to the next step in which the pages or blocks of reclaimed memory, if any, are returned to the memory pool (74).

Figure 8:
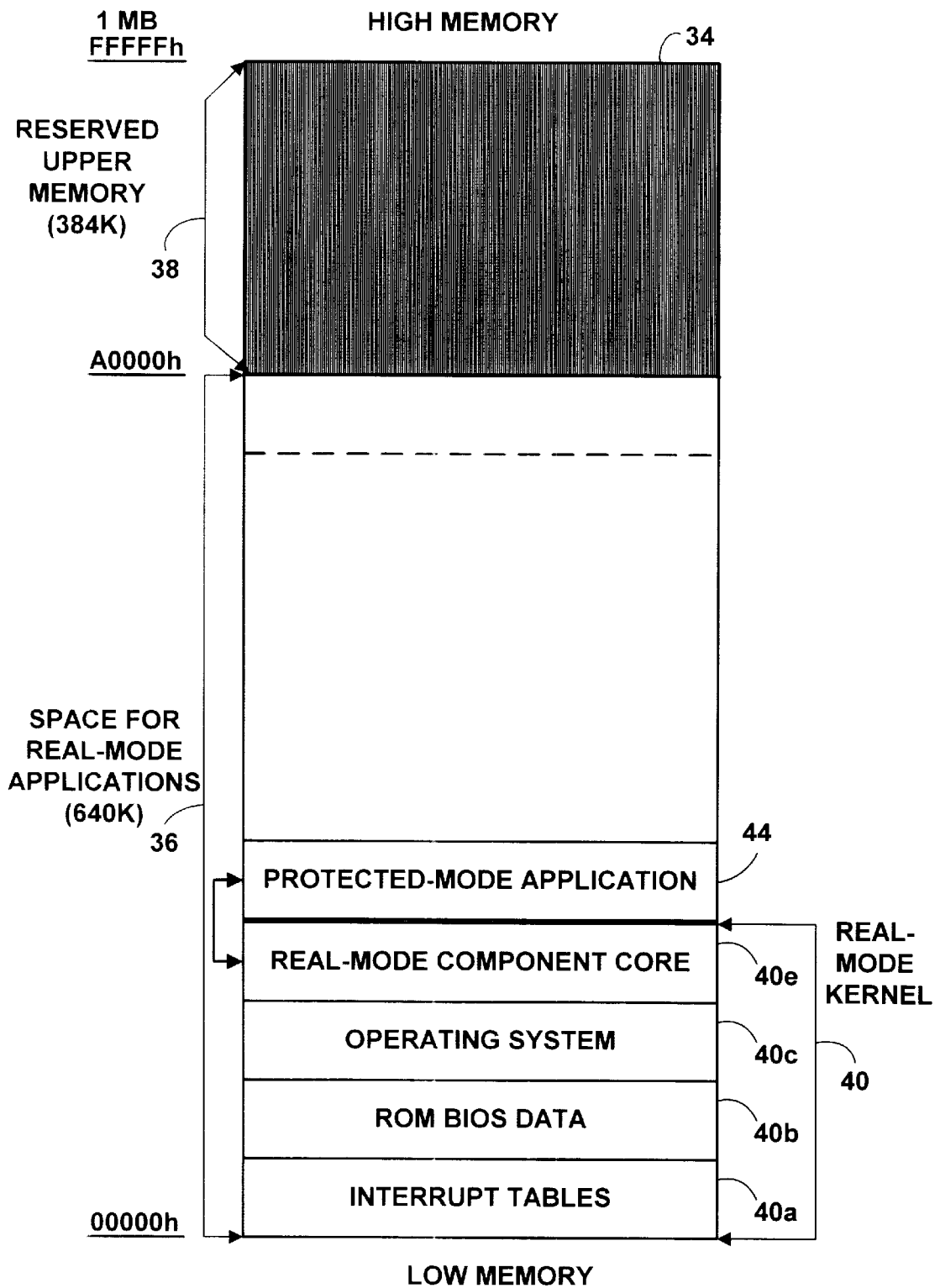
FIG. 8 is a block diagram showing the one megabyte real-mode memory layout after a redundant real-mode software component has been deactivated and the memory reclaimed.

FIG. 8 shows the final memory layout after deactivating and reclaiming high memory formerly occupied by relocatable real-mode device drivers. The real-mode device drivers 50 (FIG. 7B) have been removed from high free memory 36 as shown in FIG. 8. The real-mode component core 40e still exists in low memory for the reasons just described above (i.e. to route requests for real-mode services and interrupts). If a protected-mode application should now spawn a real-mode application, the memory layout of the MS-DOS virtual machine 34 including the reclaimed memory as shown in FIG. 8 is what is available to the spawned real-mode program. Therefore, the spawned real-mode program has additional memory 36 available to it that would not have been available without reclaiming redundant real-mode device drivers. The additional available memory is shown by the dashed line in FIG. 8.

RESTORATION OF RECLAIMED MEMORY

If the memory blocks reclaimed from the real-mode device driver are to be restored when the protected-mode application quits, the real-mode memory blocks are re-allocated from the memory pool using the de-allocation techniques described above. Starting with the steps (74–62) in FIGS. 5B and 5A, the memory pages and/or memory blocks are re-allocated from the memory pool. Then the real-mode device driver code/data is then swapped back into the memory block at the original locations (both in high and low memory) from swappable storage such as hard disk. This is the reverse operation of deactivation steps (60–62) and step (52) described above.

Figure 9:
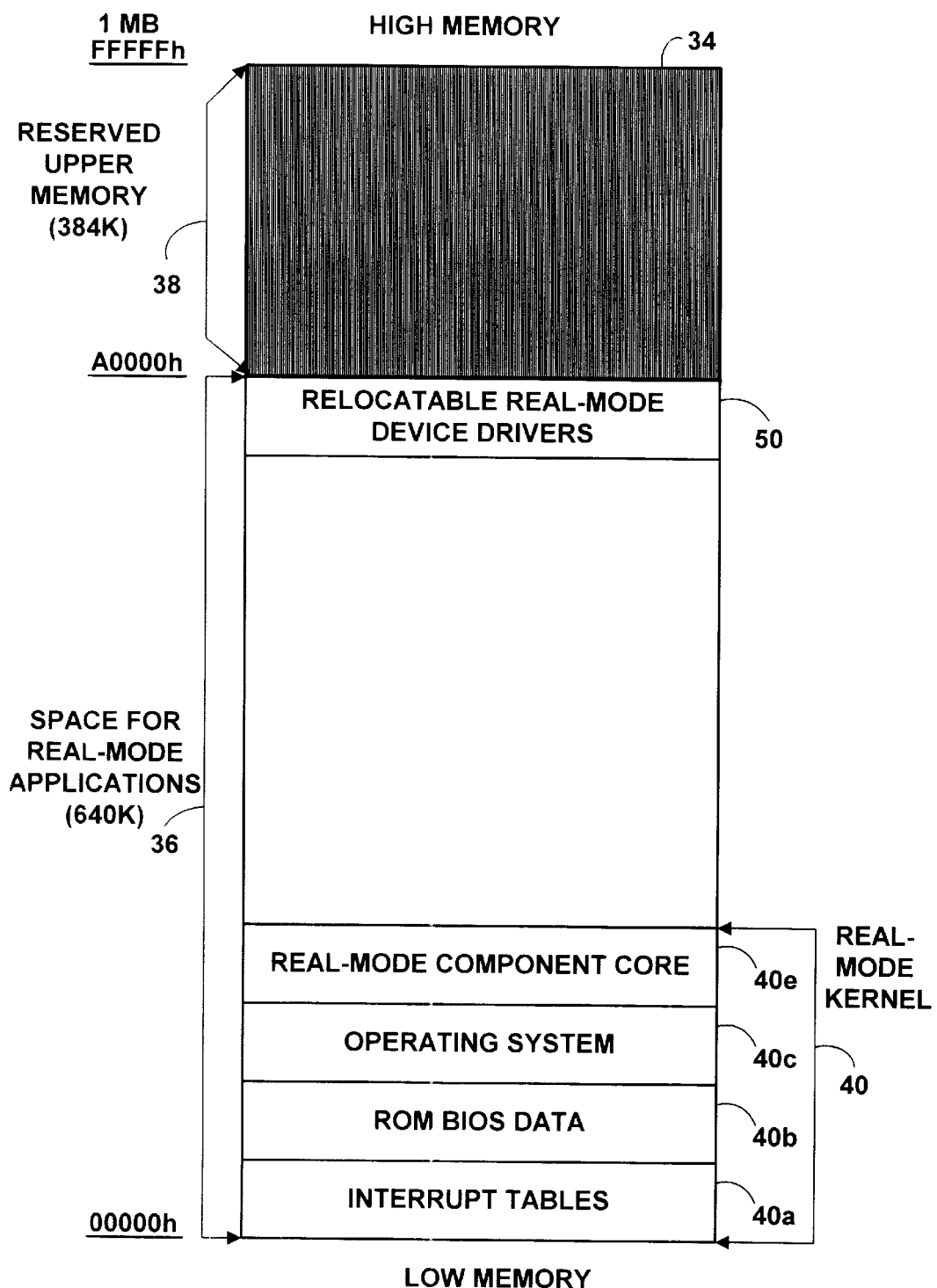
FIG. 9 is a block diagram showing the one megabyte real-mode memory layout with real-mode device drivers which have been split and relocated.

As a result of the swap back, the real-mode device driver will have all the execution paths (e.g. interrupt service, etc.) through it restored before the protected-mode application quits, since the original real-mode information (e.g. execution paths) was swapped back from hard disk. This is the reverse operation of step (56). Any protected-mode device drivers that replaced services for the real-mode device drivers will now be disabled, allowing the execution paths restored the real-mode device driver to receive and process calls meant for them (i.e. from the real-mode component core to the relocatable real-mode device drivers). The final memory layout obtained after the real-mode device drivers is shown in FIG. 9

Figure 10A:
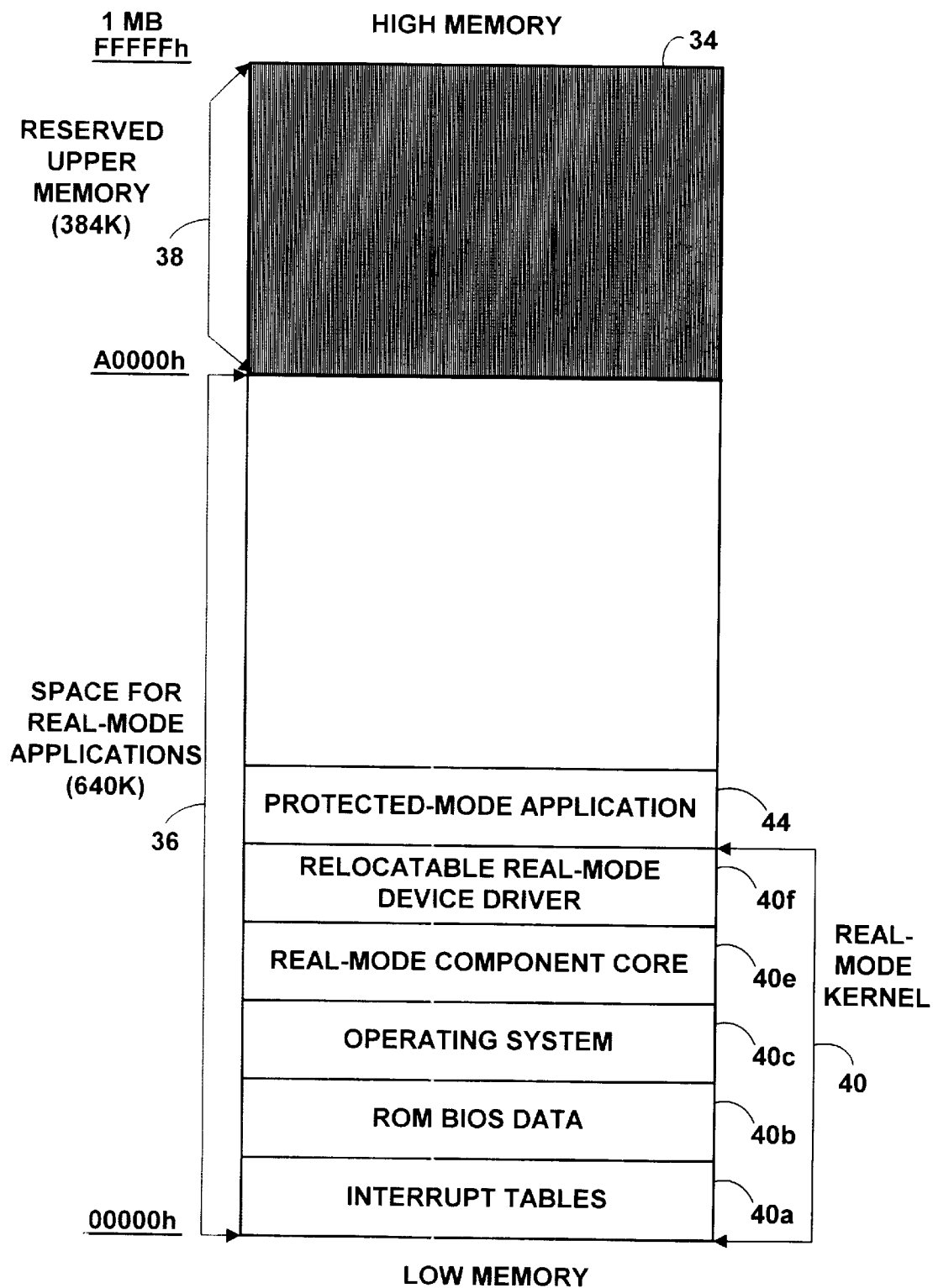
FIG. 10A is a block diagram showing the one megabyte real-mode memory layout before a redundant real-mode software component is removed from low real-mode memory.
Figure 10B:
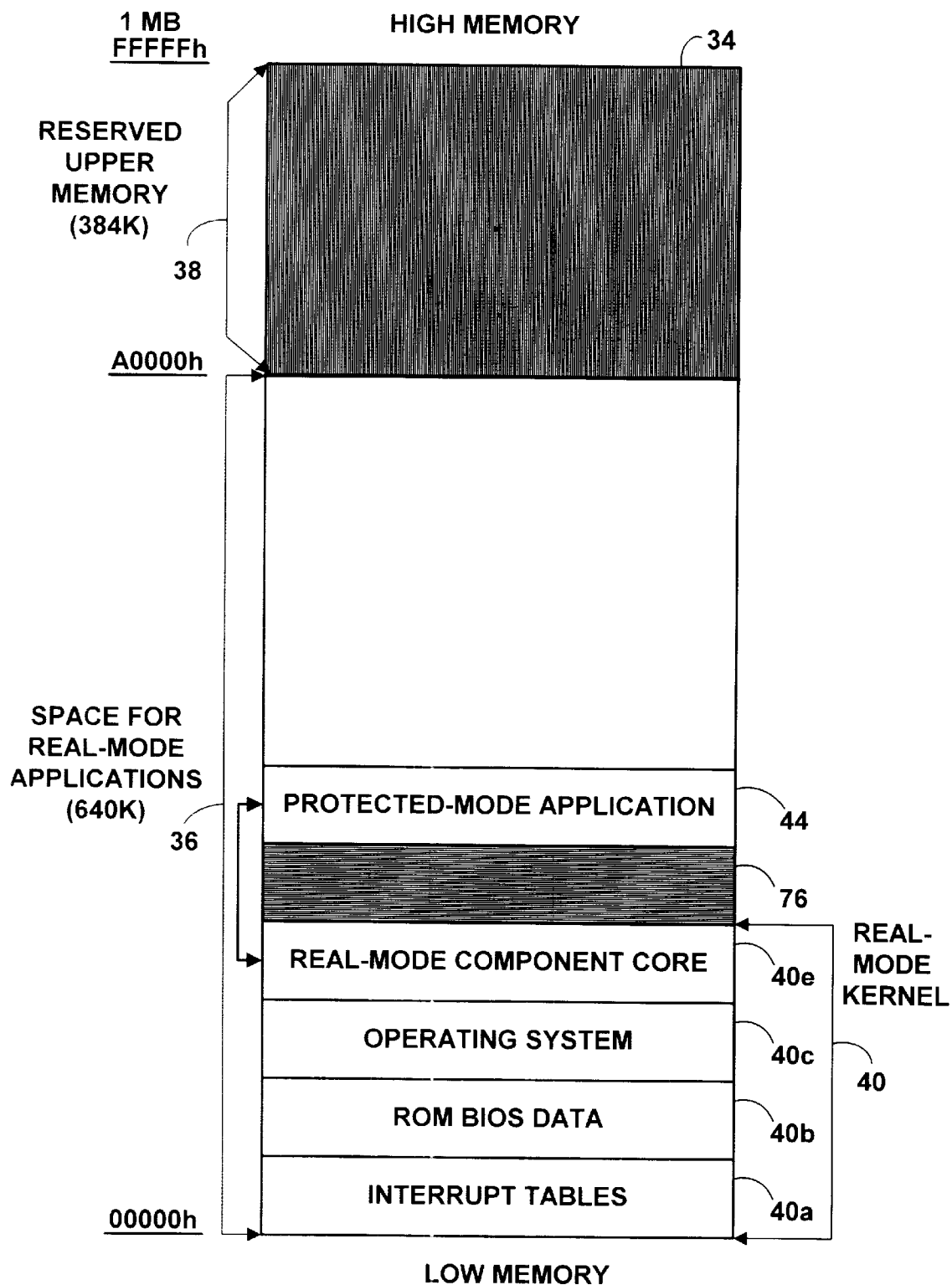
FIG. 10B is a block diagram showing the one megabyte real-mode memory layout after a real-mode software component has been removed from the low memory, creating a memory hole.

FIG. 10A shows another embodiment of this invention. In this embodiment, the real-mode device drivers split into a real-mode component core 40e and a relocatable real-mode device driver 40f which is left in low memory instead of being relocated to high memory. The memory occupied by the relocatable real-mode device driver is reclaimed by removing the relocatable portion 40f from its original location (i.e. low memory) instead of reclaiming the relocatable real-mode device driver from high memory as described previously. In this embodiment, the deactivation steps described with reference to FIGS. 5A–5B are carried out, but they create a "hole" in lower memory, that does not increase the maximum amount of large block memory available in high memory 36 (640K space). The memory "hole" 76, shown in FIG. 10B, may still be reclaimed and provide a benefit to protected-mode and real-mode applications in terms of increased total available memory as a memory block or potentially as a memory page. However, this embodiment is not as preferred since reclaiming memory in small blocks in low memory does not provide the ability to increase the maximum contiguous amount of memory in the high free memory 36 area which would be of more benefit for running larger real-mode programs.

The memory reclamation technique described herein provides several advantages over the prior art. The first is the ability to reuse physical memory containing idle real-mode software components during an application that is running in protected-mode. This frees up memory in the high real-mode memory area 36 (640K block) and permits real-mode programs that may be spawned by the protected-mode program to have a larger memory space in which to operate. It also has the benefit of improving the performance of the protected-mode program on memory constrained systems, since the maximum overall memory pool has been increased. A second advantage is to avoid consuming memory for both real-mode and protected-mode device drivers that provide the same functionality. A third advantage is protected-mode applications can spawn larger real-mode applications since there is more real-mode memory in the 1MB area available. The maximum size of the memory available in the high memory (640K) area 36 shown in FIG. 4 has a direct impact on the size of the largest real-mode application, a protected-mode application can spawn. A fourth advantage is that the memory reclaimed from a real-mode device driver can be automatically restored to the device driver when the protected-mode application quits, thereby allowing the computer system to continue operation in the real-mode with all real-mode device drivers in tact. A fifth advantage is that the memory is reclaimed and restored in an efficient way, without the need for a special application.

Having illustrated and described the principles of the invention in a preferred embodiment, it should be apparent to those skilled in the art that the embodiment can be modified in arrangement and detail without departing from such principles. For example, elements of the preferred embodiment shown in software may be implemented in hardware and vice versa. The real mode software components from which memory may be reclaimed are not limited to the described device drivers. In view of the many possible embodiments to which the principles of the invention may be applied, it should be recognized that the illustrated embodiment is only a preferred example of the invention and should not be taken as a limitation on the scope of the invention. Rather, the scope of the invention is defined by the following claims. I therefore claim as my invention all that comes within the scope and spirit of these claims.

I claim:

1. In a computer system that runs in two modes and having memory divided into memory blocks, a first-mode having a first addressing range, and a second-mode having a second addressing range, a method of reclaiming memory occupied by first-mode software components when the system switches from first-mode to second-mode to run a second-mode application in memory, the method comprising:

splitting first-mode software components into a non-removable core portion and a removable portion;
   starting a second-mode application in memory;
   determining from information from memory blocks occupied by first-mode software components which first-mode software components in memory are functionally equivalent to second-mode components of the second-mode application;
   modifying the non-removable core portion of a first-mode software component to refer to an equivalent second-mode component; and
   reclaiming memory in the first addressing range occupied by the removable portion of the first-mode component.

2. The method of claim 1 wherein the first-mode is a real-mode, and the second-mode is a protected-mode.

3. The method of claim 1 wherein first-mode is a virtual-8086-mode, and the second-mode is a protected-mode.

4. The method of claim 1 wherein the splitting step includes determining an address of a memory block occupied by the removable portion of a first-mode software component, a size of the memory block occupied by the removable portion, and addresses of services or interrupt handlers associated with the memory block, if any, of the removable portion.

5. The method of claim 1 wherein the splitting step further includes specifying special characteristics of a block including:

whether the block is currently reclaimable;
   whether the block must be restored; and
   whether the block is currently part of the operating system memory area.

6. The method of claim 1 wherein the memory includes high memory and low memory, the low memory including a dedicated portion for operating system, bios and interrupt components, the high memory including a free memory portion available for use by first and second mode components, and the splitting step includes moving the removable portion of the first-mode software component to high memory above available free memory portion and retaining the first-mode non-removable core portion in the dedicated portion of low memory.

7. The method of claim 1 wherein the modifying step includes:

storing the first-mode removable and non-removable core portions in another storage location for later retrieval;
   replacing all references in the first-mode non-removable core portion to the removable first-mode portion with references to the equivalent second-mode component; and
   replacing all execution paths in the first-mode non-removable core portion that travel through the first-mode removable portion with execution paths through the second-mode component that circumvent the first-mode removable portion.

8. The method of claim 1 wherein the reclaiming step includes:

determining if the size of a memory block occupied by first-mode software components to be reclaimed is equivalent in size to an operating system memory page,
   if so, returning the occupied memory block as an operating system memory page to a memory pool,
   if not, further determining:
      if a memory block adjoining the occupied memory block is reclaimable;
      if so, not returning the occupied memory block to the memory pool so an operating system memory page may be reclaimed later by collecting the adjoining memory blocks; and
      if not, returning the occupied memory block as a memory block to the memory pool.

9. The method of claim 1 including restoring a first-mode software component to the memory, comprising:

re-allocating memory to hold the removable portion of the first-mode software component to be restored;
   restoring the first-mode removable portion from other storage to its original location in real-mode memory; and
   restoring the first-mode core portion of the real-mode software component from other storage to refer again to the first-mode removable portion.

10. The method of claim 1 wherein the first-mode component and the functionally equivalent second-mode component are device drivers.

11. The method of claim 1 where determining which removable first-mode software components in memory are functionally equivalent to second-mode components of a second-mode application step includes determining which removable first-mode components, if any, can be permanently removed from memory and never restored to memory.

12. The method of claim 1 where the splitting step includes leaving both the removable portion and the non-removable core portion of the first-mode software component in a dedicated portion of low memory.

13. The method of claim 12 where the reclaiming step includes reclaiming the dedicated portion of low memory occupied by the removable portion of the first-mode component, thereby creating a memory hole in the dedicated portion of low memory.

14. An apparatus according to claim 1 including a computer system that runs in two distinct modes, first mode and second-mode for performing the steps of claim 1.

15. A program storage device readable by a machine and encoding a program of instructions for executing the method steps of claim 1.

16. A computer readable medium having stored therein instructions for causing a computer to perform the method of claim 1.

17. The method of claim 1 where the reclaiming step results in a larger amount of memory available for use by the second-mode application than before the reclaiming step.

18. The method of claim 1 wherein the information from the memory blocks includes one or more of first-mode services or interrupt services associated with the first mode software component.

19. A computer system that runs in first-mode and second-mode and reclaims memory divided into memory blocks from first-mode software components, comprising:

means for loading a first-mode software component into memory which splits into a non-removable core portion and a removable portion;

means for determining from information from memory blocks occupied by first-mode software components which first-mode software components in memory are functionally equivalent to second-mode components of a second-mode application;

means for modifying the non-removable core portion of the first-mode software component, where the core portion refers to the removable portion, to refer to the equivalent second-mode component; and means for reclaiming memory occupied by the removable portion of the first-mode component.

20. The apparatus of claim 19 including:

means for re-allocating memory to hold the removable portion of the first-mode software component to be restored;

means for restoring the removable portion from other storage to its original location in memory; and means for restoring the core portion of the first-mode software component from other storage to refer again to the removable portion.

21. Apparatus for reclaiming memory divided into memory blocks from first-mode software components when a computer system switches from a first-mode to second-mode to run a second-mode application, comprising:

(a) a medium for containing computer code; and (b) computer code stored on the medium for:

splitting first-mode software components into a non-removable core portion stored in one part of memory and a removable portion relocated to another part of memory when the first-mode software component is loaded into memory;

starting a second-mode application in memory;

determining from information from memory blocks occupied by first-mode software components which first-mode software components in memory are functionally equivalent to second-mode components of a second-mode application;

modifying the core portion of a first-mode software component, where the core portion refers to the non-removable portion, to refer to an equivalent second-mode component; and reclaiming memory occupied by the removable portion of the first-mode component.

22. The apparatus of claim 21 wherein the medium is a magnetic recording material.

23. The apparatus of claim 21 wherein the medium is memory.

24. The apparatus of claim 21 wherein the medium is disk storage.

25. The apparatus of claim 21 wherein the medium is a semiconductor device.

26. In a computer system that runs in two modes, a first-mode and a second-mode, and having memory divided into memory blocks, a method of reclaiming memory occupied by first-mode software components when the system switches from first-mode to second-mode to run a second-mode application in memory, the method comprising:

starting a second-mode application in memory;

determining from information from memory blocks occupied by first-mode software components which first-mode software components in memory are functionally equivalent to second-mode components contained in the second-mode application;

deleting the first-mode components that are functionally equivalent to the second-mode components from memory;

reclaiming the memory occupied by the deleted first-mode components by returning the memory to a memory pool; and intercepting calls subsequently made to the removed first-mode components and re-directing the calls to the functionally equivalent second-mode components.

27. A computer readable medium having stored therein instructions for causing a computer to perform the method of claim 26.

* * * * *

UNITED STATES PATENT AND TRADEMARK OFFICE
CERTIFICATE OF CORRECTION

PATENT NO. : 6,282,621 B1
DATED : August 28, 2001
INVENTOR(S) : Jeffrey T. Parsons It is certified that error appears in the above-identified patent and that said Letters Patent is hereby corrected as shown below:

Column 2,
Line 45, "8bit", should read -- 8-bit --.

Column 3,
Line 29, "a repositories", should read -- as repositories --.

Column 6,
Line 46, "virtual8086", should read -- virtual-8086 --

Column 10,
Line 23, "FIG. 9", should read -- FIG. 9. --

Column 11,
Line 4, "in tact", should read -- intact --

Column 12,
Line 6, "first mode", should read -- first-mode --.

Signed and Sealed this

Thirtieth Day of April, 2002

Attest:

JAMES E. ROGAN
*Attesting Officer*      *Director of the United States Patent and Trademark Office*